(12) United States Patent
Lin

(10) Patent No.: US 9,412,276 B2
(45) Date of Patent: Aug. 9, 2016

(54) FOLLOWING DISTANCE REMINDING DEVICE AND METHOD THEREOF

(71) Applicant: Tsun-Huang Lin, Taipei (TW)

(72) Inventor: Tsun-Huang Lin, Taipei (TW)

( * ) Notice: Subject to any disclaimer, the term of this patent is extended or adjusted under 35 U.S.C. 154(b) by 28 days.

(21) Appl. No.: 14/335,464

(22) Filed: Jul. 18, 2014

(65) Prior Publication Data

US 2016/0019791 A1 Jan. 21, 2016

(51) Int. Cl.
| | | |
|---|---|---|
| *A01B 69/00* | (2006.01) | |
| *G08G 1/16* | (2006.01) | |
| *G06K 9/32* | (2006.01) | |
| *G06K 9/46* | (2006.01) | |
| *G08B 21/24* | (2006.01) | |
| *G06T 7/60* | (2006.01) | |

(52) U.S. Cl.
CPC ............. *G08G 1/166* (2013.01); *G06K 9/325* (2013.01); *G06K 9/4604* (2013.01); *G06T 7/602* (2013.01); *G08B 21/24* (2013.01); *G06T 2207/10016* (2013.01); *G06T 2207/30236* (2013.01); *G06T 2207/30261* (2013.01)

(58) Field of Classification Search
CPC .................. B60W 2550/306; B60W 2550/30; B60W 30/16; G01S 17/023; G01S 13/931; G05D 1/0289; G08G 1/161; G08G 1/16
USPC ............ 701/117, 301, 41; 340/435, 436, 905, 340/903, 937, 961
See application file for complete search history.

(56) References Cited

U.S. PATENT DOCUMENTS

| | | | | |
|---|---|---|---|---|
| 7,796,081 B2* | 9/2010 | Breed | ................. | B60N 2/2863 340/435 |
| 2008/0062009 A1* | 3/2008 | Marton | ................ | G08G 1/0175 340/937 |
| 2010/0085173 A1* | 4/2010 | Yang | ..................... | G08G 1/166 340/435 |
| 2012/0310518 A1* | 12/2012 | Chen | ..................... | G08G 1/162 701/301 |

* cited by examiner

*Primary Examiner* — Gertrude Arthur Jeanglaude
(74) *Attorney, Agent, or Firm* — Li & Cai Intellectual Property (USA) Office

(57) ABSTRACT

A device and method for reminding following distance are provided. The following distance reminding device (FDRD) adapted for a first vehicle is capable of computing a following distance between the first vehicle and a second vehicle. The FDRD comprises an image acquiring module, a reminding module, and a processing module. The image acquiring module receives a vehicle image of the second vehicle. The processing module extracts a license plate image from the vehicle image, and computes the following distance between the first vehicle and the second vehicle according to image characteristics of the license plate image. The processing module computes a safe distance according to a driving speed of the first vehicle and the image characteristics, and determines whether the following distance is more than the safe distance or not, in order to control the reminding module to correspondingly send a reminding message.

10 Claims, 8 Drawing Sheets

| default license plate image size | following distance |
|---|---|
| 190mm×80mm | 10 meters |
| 76mm×32mm | 50 meters |

FIG.5A

| font size of license plate image | following distance |
|---|---|
| 36mm×72mm | 3 meters |
| 9mm×18mm | 25 meters |

FIG.5B

| license plate image size/vehicle image size (%) | following distance |
|---|---|
| 80% | 2 meters |
| 10% | 30 meters |

FIG.6

FOLLOWING DISTANCE REMINDING DEVICE AND METHOD THEREOF

BACKGROUND

1. Technical Field

The present disclosure relates to a reminding device and a method thereof, in particular, to a following distance reminding device and method thereof

2. Description of Related Art

Generally, a sensing device disposed on a vehicle can determine the following distance between the vehicle and another while the vehicle drives. The sensing device mentioned above can be such as the microwave radar sensing system, the infrared photoelectric radar sensing system, and the ultrasonic radar sensing system. However, there is a problem with the microwave radar sensing system and the ultrasonic radar sensing system as the sensing distance is too short, so that it is not suitable for the vehicle driving at high speed or for long distance.

SUMMARY

Accordingly, exemplary embodiments of the present disclosure provide a device that can remind of the following distance and determine whether the following distance remains within traffic safety conditions by acquiring the vehicle image, and a method thereof.

An exemplary embodiment of the present disclosure provides a following distance adapted for a first vehicle, calculating a following distance between the first vehicle and a second vehicle, the following distance reminding device comprises an image acquiring module, a reminding module, and a processing module. The image acquiring module receives a vehicle image of the second vehicle. The processing module is coupled to the image acquiring module and the reminding module, wherein the processing module extracts a license plate image from the vehicle image, and computes the following distance between the first vehicle and the second vehicle according to image characteristics of the vehicle image, and wherein the processing module computes a safe distance according to a driving speed of the first vehicle and the image characteristics, and determines whether the following distance is more than the safe distance or not, in order to control the reminding module to correspondingly send a reminding message.

An exemplary embodiment of the present disclosure provides a method for reminding following distance, adapted for a first vehicle, computing a following distance between the first vehicle and a second vehicle, the method comprising the following steps. First, a vehicle image of the second vehicle is received. Then, a license plate image is extracted from the vehicle image. Next, the following distance between the first vehicle and the second vehicle is computed according to a driving speed and image characteristics of the license plate image. Next, it is determined whether the following distance is more than the safe distance, and a reminding message is correspondingly sent depending on the determination result.

To sum up, the exemplary embodiment of the present disclosure provides that the following distance reminding device and method thereof can receive the vehicle image and analyze it to extract the license plate image with an image processing means, in order to compute the following distance between the first vehicle and the second vehicle, and the present disclosure further comprises computing the safe distance that the first vehicle and the second vehicle should keep apart according to the driving speed of the first vehicle and the image characteristics of the license plate image of the second vehicle. Therefore, the present disclosure can determine accurately and immediately whether the following distance is kept in traffic safety conditions by the simple hardware structure.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIG. 5A-FIG. 5B are diagrams illustrating lookup tables of default license plate size and following distances provided in accordance to an exemplary embodiment of the present disclosure.

FIG. 6 is a diagram illustrating a lookup table of the percentage of the vehicle image size occupied by the license plate image size and the following distance provided in accordance to an exemplary embodiment of the present disclosure.

DESCRIPTION OF THE EXEMPLARY EMBODIMENTS

Figure 1:
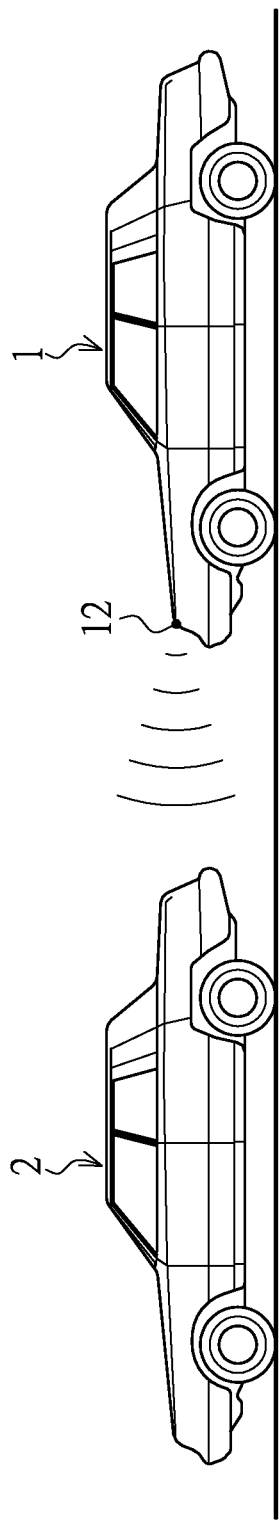
FIG. 1 is a diagram illustrating vehicles driving on roads in which a following distance reminding device is disposed on one of them provided in accordance to an exemplary embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

A following distance reminding device and method provided in the present disclosure can determine a following distance between a driving vehicle and another vehicle ahead and/or behind, by receiving the vehicle image of the other vehicle ahead and/or behind. Particularly, the vehicle image comprises, for example, a license plate image, and the following distance device and method thereof provided in the present disclosure can determine whether the following distance between the driving vehicle and the other vehicle ahead and/or behind is more than a safe distance, by using related image characteristics of the license plate image and a driving speed of the vehicles.

An Exemplary Embodiment of the Following Distance Reminding Device

FIG. 1 is a diagram illustrating vehicles driving on roads in which a following distance reminding device is disposed on one of them provided in accordance to an exemplary embodiment of the present disclosure. Referring to FIG. 1, a first vehicle 1 and a second vehicle 2 drive on the road, and the first vehicle 1 drives behind the second vehicle 2. As shown in FIG. 1, a following distance reminding device 12 is disposed on the front side of the first vehicle 1. In general, the following distance reminding device is such as the usual drive recorders disposed on the windshield with a stand, and performs its function through the windshield of the first vehicle 1, in which the visual field of the following distance reminding device 12 of the first vehicle 1 covers the back side of the second vehicle 2. The specific position to dispose the following distance reminding device 12 on the first vehicle 1 is not limited in the present disclosure, any position that the following distance device can be disposed on the front side of the first vehicle 1 without obstructing the visual field can be performed in the present disclosure.

Figure 2:
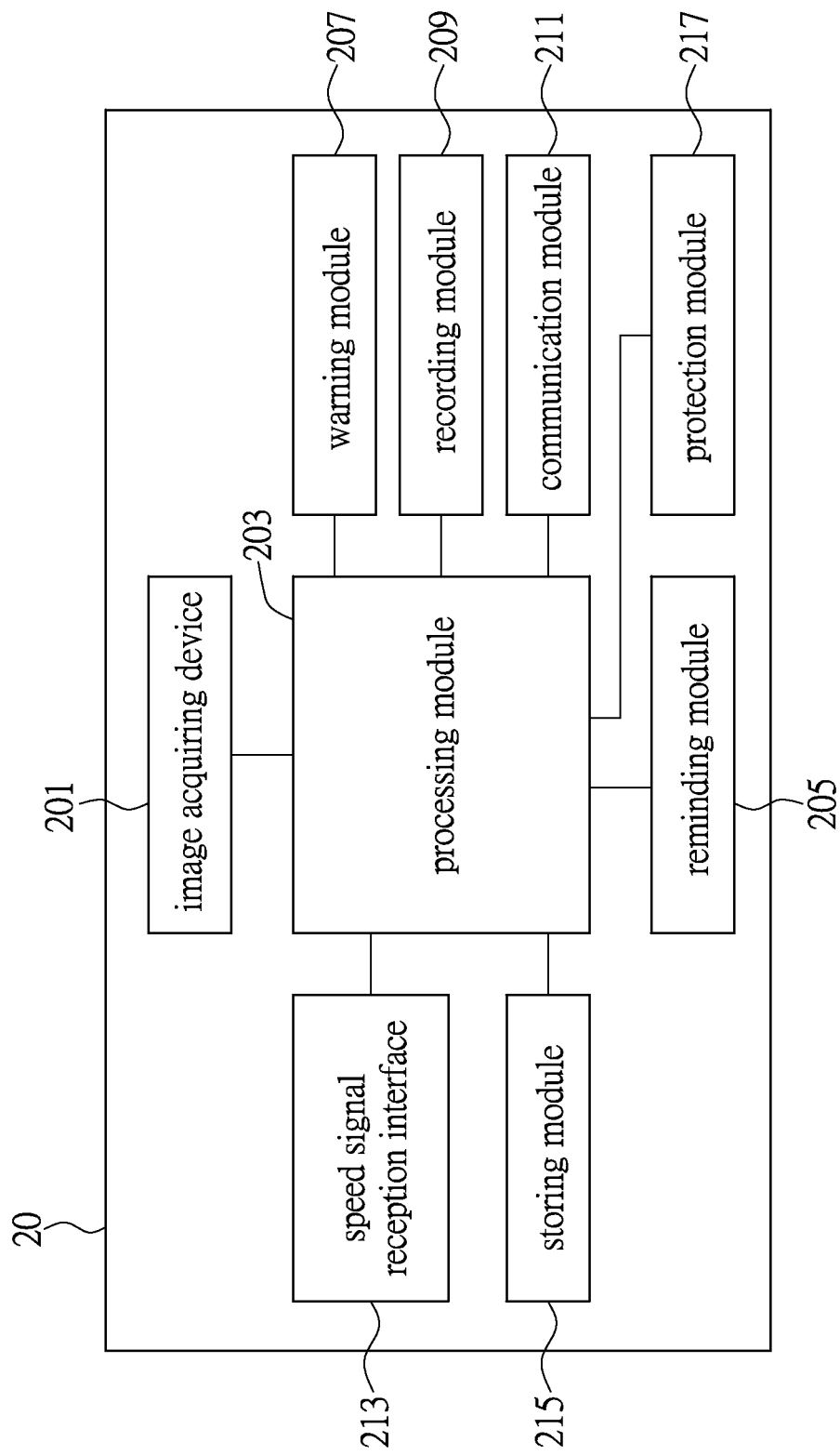
FIG. 2 is a function block diagram illustrating the following distance reminding device provided in accordance to an exemplary embodiment of the present disclosure.

FIG. 2 is a function block diagram illustrating the following distance reminding device provided in accordance to an exemplary embodiment of the present disclosure. Referring to FIG. 1 and FIG. 2, the following distance reminding device 20 adapted for the first vehicle 1 is used for computing the following distance between the first vehicle 1 and the second vehicle 2. The following distance reminding device 20 comprises an image acquiring module 201, a processing module 203, a reminding module 205, a warning module 207, a recording module 209, a communication module 211, a speed signal reception interface 213, and a storing module 215. The following will provide further illustration for each module of the following distance reminding device 20.

Referring to FIG. 1 and FIG. 2, the image acquiring module 201 is used for receiving the vehicle image of the second vehicle 2. In the example, the first vehicle 1 drives behind the second vehicle 2, and the following distance reminding device 20 is disposed on the front side of the first vehicle 1, so that the image acquiring module 201 can receive the vehicle image presenting the back side of the second vehicle 2. In the other example, the first vehicle 1 drives ahead of the second vehicle 2, and the following distance reminding device 20 is disposed on the rear side of the first vehicle 1, so that the image acquiring module 201 can receive the vehicle image presenting the front side of the second vehicle 2. It should be noted that the image acquiring module 201 is disposed on the first vehicle 1 for the visual field covering the license plate image of the front side and/or the back side of the second vehicle 2, so that the license plate image of the front side and/or the back side of the second vehicle 2 can be covered within the vehicle image received by the image acquiring module 201. The image acquiring module 201 is such as a recorder, a digital camera, and a mobile device, etc., any device having a lens can be used as the image acquiring module 201.

Referring to FIG. 1 and FIG. 2, the processing module 203 coupled to the image acquiring module 201 is used for processing the vehicle image and computing the following distance between the first vehicle 1 and the second vehicle 2. In the example, the processing module 203 analyzes the vehicle image received by the image acquiring module 201 for extracting the license plate image of the second vehicle 2. The processing module 203 can retrieve image characteristics of the vehicle image with image processing techniques, for example, by analyzing the license plate shape in the vehicle image to retrieve the block of the license plate image or by analyzing the license plate number and/or the license plate color of the license plate image. The processing module 203 is, but is not limited to, the image processing chipset or the image processor, those skilled in the art would be able to realize that any type of image processing techniques can be implemented in the present disclosure. The image characteristics of the vehicle image can be provided to compute the following distance by the processing module 203. The exemplary example of the method for computing the following distance with the image characteristics by the processing module 203 will be disclosed as following.

Referring to FIG. 1 and FIG. 2, the speed signal reception interface 213 receives a driving speed of the first vehicle 1. The following distance reminding device 20 connects to the automotive computer, the on-board unit, or the GPS of the first vehicle 1 through the circuit and the speed signal reception interface 213, in order to receive the driving speed or the related data. The reminder module 205 coupled to the processing module 203 sends a reminding message for notifying the drivers thereon and nearby. Particularly, the processing module 203 computes a safe distance that the first vehicle 1 should keep apart from the second vehicle 2 according to the driving speed of the first vehicle 1 and the image characteristics. The following example will illustrate the method for computing the safe distance. After computing the safe distance, the processing module 203 determines whether the following distance between the first vehicle 1 and the second vehicle 2 is more than or equal to the safe distance. When the processing module 203 determines that the following distance is less than the safe distance, the processing module 203 controls the reminding module 205 to correspondingly send the reminding message. The reminding module 205 is such as the display panel or the loudspeaker, and the reminding message is such as a prompting message of decelerating driving speed of the first vehicle 1 when the first vehicle 1 drives behind the second vehicle 2 and the following distance is less than the safe distance. The reminding message is such as a prompting message of accelerating driving speed of the first vehicle 1 when the first vehicle 1 drives ahead of the second vehicle 2 and the following distance is less than the safe distance.

Referring to FIG. 1 and FIG. 2, the storing module 215 is used for storing the image characteristics of the vehicle image and a lookup table provided for the processing module 203 to compute the following distance. The lookup table will be illustrated by the following figures. The warning module 207 coupled to the processing module 203 is used for sending a warning message. After computing the safe distance, the processing module 203 determines whether the following distance is more than or equal to the safe distance, moreover, the processing module 203 determines whether the following distance is less than a warning distance. When determining that the following distance is less than the warning distance, the processing module 203 controls the warning module 207 to send the warning message, wherein the warning distance is another decision criteria besides the safe distance. In one example, the safe distance and the warning distance can be predesigned as default values by users. When the processing module 203 determines that the following distance is less than the warning distance, it represents that the current following distance between the first vehicle 1 and the second vehicle 2 is too short so as to increase the probability of traffic accidents occurring, therefore a more urgent message to caution the driver against increasing driving speed is generated. The warning module 207 is such as the display panel or the loudspeaker. In the example, the warning message is including but not limited to at least one of a light sign and a horn sign generated by the first vehicle.

Referring to FIG. 1 and FIG. 2, the recording module 209 is coupled to the processing module 203 and controlled by the processing module 203. In the example, when the following distance between the first vehicle 1 and the second vehicle 2 is less than the safe distance, the processing module 203 controls the recording module 209 to record and store the vehicle image received by the image acquiring module 201. The communication module 211 is coupled to the processing module 203 and controlled by the processing module 203. In the example, when the following distance between the first vehicle 1 and the second vehicle 2 is less than the warning distance which represents the more urgent situation, the processing module 201 controls the communication module 211 to transmit the vehicle image stored in the recording module 209 through the communication network to a remote server for backup. The protection module 217 is coupled to the processing module 203 and activates a protection procedure to take over the first vehicle 1. For example, the first vehicle 1 will be forced to stop going closer to the second vehicle 2. The protection module 217 is such as the anti-lock brake system (ABS), the traction control system (TCS), the Vehicle Stability Control (VSC) or other control system for protecting the vehicle. In one embodiment, the protection module 217 of the first vehicle 1 activates the protection procedure to adjust the following distance between the first vehicle 1 and the second vehicle 2, at the same time, the warning module 207 sends a warning light signal or a sound signal toward the second vehicle 2. In another example, the protection module 217 can activate without the demand for which the warning module 207 sends the warning message, for instance, the protection module 217 operates while the driver brakes suddenly at any situation. The present disclosure provides an exemplary embodiment for activating the warning module 207 and the protection module 217 at the same time, and it should not be limited thereto. Besides, the present disclosure provides an exemplary for activating one of the warning module 207 and the protection module 217 when the processing module 203 determines the following distance is less than the safe distance and/or the warning distance, for instance, the warning module 207 only sends the warning message while the protection module 217 remains static, and those skilled in the art would design the operation modes cooperated with the warning module 207 and the protection module 217 based on practical situations.

Figure 3:
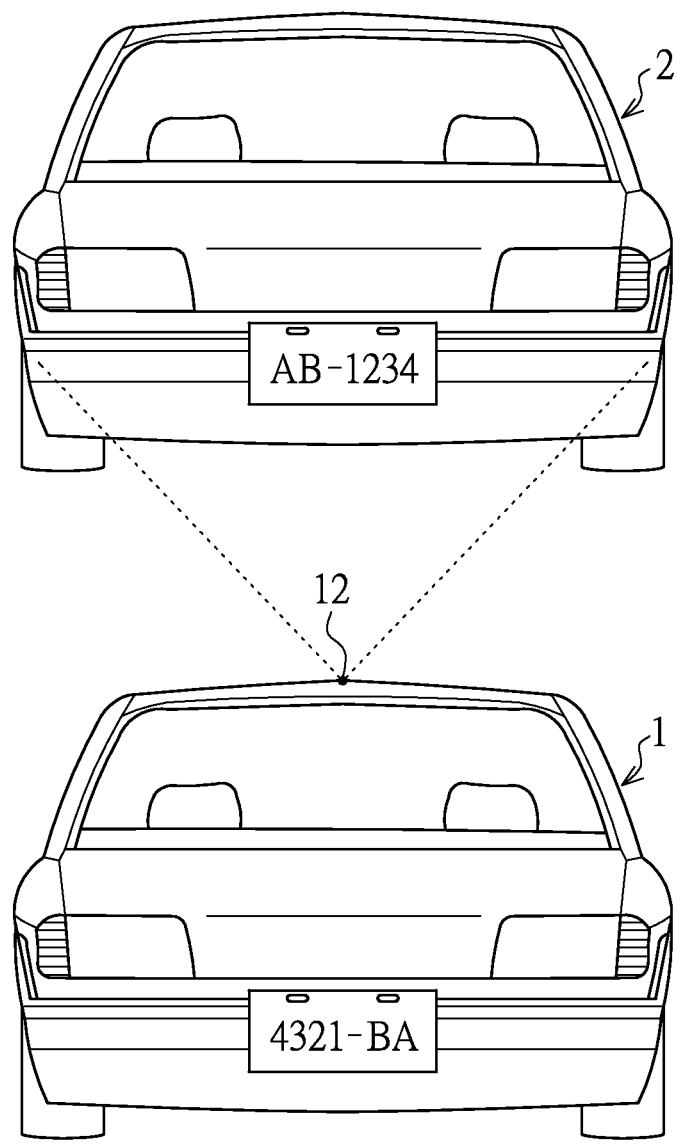
FIG. 3 is a back view diagram illustrating the vehicle driving on roads in which the following distance reminding device is disposed on the vehicle provided in accordance to another exemplary embodiment of the present disclosure.

FIG. 3 is a back view diagram illustrating the vehicle driving on roads in which the following distance reminding device is disposed on the vehicle provided in accordance to another exemplary embodiment of the present disclosure. Referring to FIG. 3, the first vehicle 1 drives behind the second vehicle 2, and the following distance reminding device 12 is disposed on the front side of the first vehicle 1. In this example, the visual field of the following distance reminding device 12 covers the license plate image of the back side of the second vehicle 2 with the number "AB-1234", in which the license plate is attached on the rear side of the second vehicle 2. The visual field is shown as the dashed line in FIG. 3.

Figure 4A:
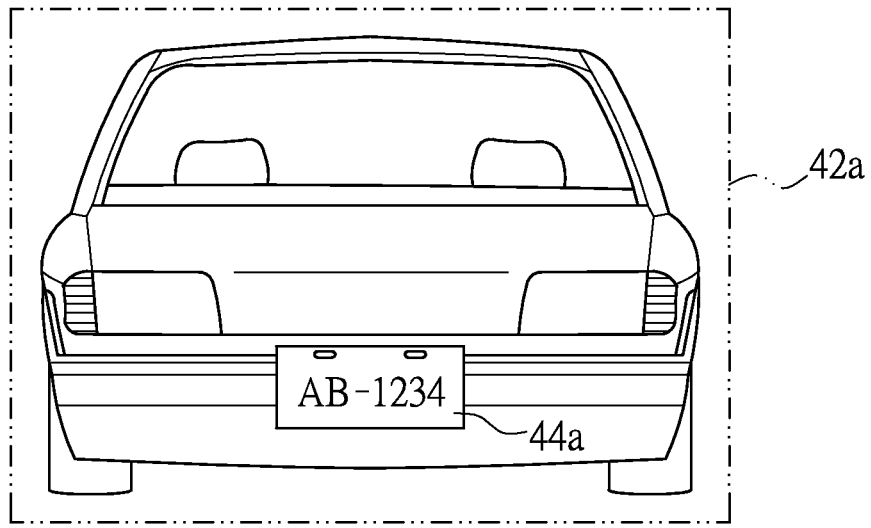
FIG. 4A-FIG. 4C are diagrams illustrating a vehicle image received by an image acquiring module provided in accordance to an exemplary embodiment of the present disclosure.
Figure 4B:
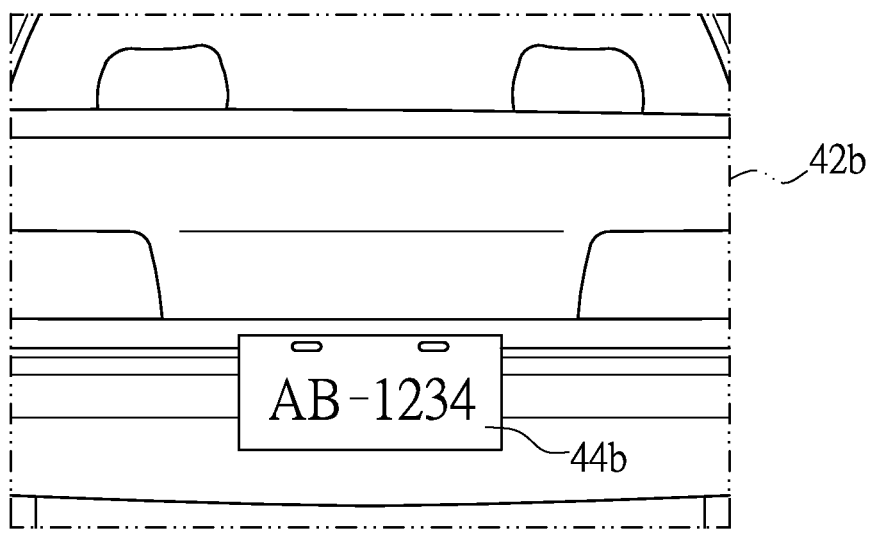
Figure 4C:
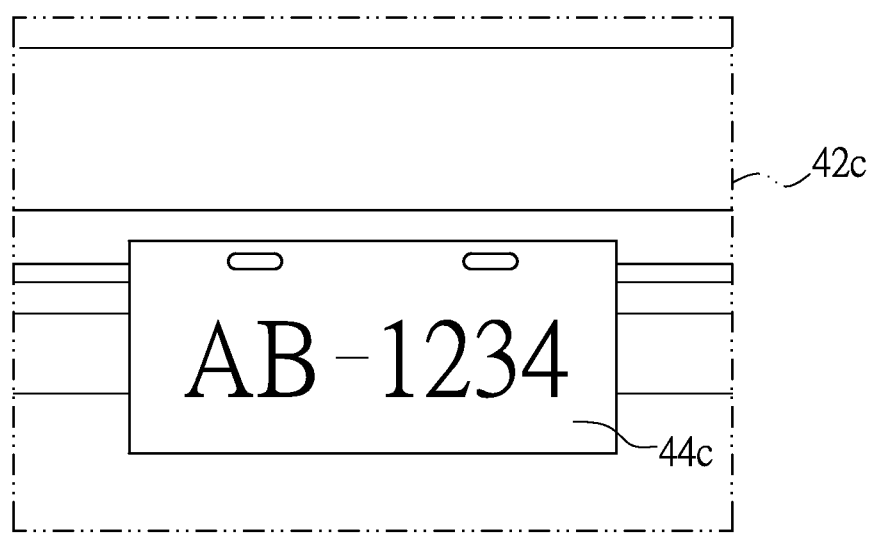

FIG. 4A-FIG. 4C are diagrams illustrating a vehicle image received by an image acquiring module provided in accordance to an exemplary embodiment of the present disclosure.

Referring to FIG. 2, FIG. 3, and FIG. 4A, the vehicle image 42a is received by the image acquiring module 201 when the first vehicle 1 drives behind the second vehicle 2 by a first following distance apart. After the image acquiring module 201 receives the vehicle image 42a, the processing module 203 extracts the license plate image 44a from the vehicle image 42a with the image processing techniques. In the example, the first following distance between the first vehicle 1 and the second vehicle 2 is more than the safe distance.

Referring to FIG. 2, FIG. 3, and FIG. 4B, the vehicle image 42b is received by the image acquiring module 201 when the first vehicle 1 drives behind the second vehicle 2 by a second following distance apart. After the image acquiring module 201 receives the vehicle image 42b, the processing module 203 extracts the license plate image 44b from the vehicle image 42b with the image processing techniques. In the example, the second following distance between the first vehicle 1 and the second vehicle 2 is equal to or less than the safe distance and more than the warning distance.

Referring to FIG. 2, FIG. 3, and FIG. 4C, the vehicle image 42c is received by the image acquiring module 201 when the first vehicle 1 drives behind the second vehicle 2 by a third following distance apart. After the image acquiring module 201 receives the vehicle image 42c the processing module 203 extracts the license plate image 44c from the vehicle image 42c with the image processing techniques. In the example, the third following distance between the first vehicle 1 and the second vehicle 2 is equal to or less than the warning distance.

Referring to FIG. 3, FIG. 4A-FIG. 4C, wherein the first following distance is more than the second distance, and the second distance is more than the third distance. In other words, the following distance reminding device 12 receives the vehicle image 42a, 42b, and 42c respectively at different time points, and extracts the license plate image 44a, 44b, and 44c from the vehicle image 42a, 42b, and 42c respectively. The following exemplary in the present disclosure will illustrate the method for computing the following distance between the first vehicle 1 and the second vehicle 2 by the following distance reminding device 12 according to the image characteristics of the license plate image 44a, 44b, and 44c.

An Exemplary Embodiment of a Method for Computing the Following Distance

FIG. 5A-FIG. 5B are diagrams illustrating lookup tables of default license plate size and following distances provided in accordance to an exemplary embodiment of the present disclosure.

Referring to FIG. 5A-FIG. 5B, a lookup table is stored in the storing module 215 of the following distance reminding device 20. It should be noted that the default license plate size and the license plate font size should meet the criterion, for instance, the legal requirement of the government in each country, for the vehicle registration plate. And, there is a relation between the default license plate size and the following distance, and/or a relation between the license plate font size and the following distance provided in the present disclosure. Referring to FIG. 2 and FIG. 3, after the image acquiring module 201 disposed on the first vehicle 1 receives the vehicle image of the second vehicle 2, the processing module 203 extracts the license plate image from the vehicle image. Thereafter, the processing module 203 computes the image characteristics from the license plate image with the image processing means.

In the exemplary example, the image characteristics are such as the license plate size of the vehicle image, as shown as the lookup table in FIG. 5A. When retrieving the license plate size, the processing module 203 uses the lookup table to take the following distance corresponding to the license plate size. For example, when the license plate image size is 190 mm (millimeter)×80 mm (millimeter), the processing module 203 takes the following distance between the first vehicle 1 and the second vehicle 2 as 10 meters according to the lookup table shown as in FIG. 5A.

In another example, the image characteristics are such as the font size of the license plate image, shown as the lookup table in FIG. 5B. When receiving the vehicle image, the processing module 203 analyzes the license plate number of the vehicle image with the image processing means, and computes the font size of the license plate image. For example, when the font size of the license plate image is 36 mm (millimeter)×72 mm (millimeter), the processing module 203 takes the following distance between the first vehicle 1 and the second vehicle 2 as 3 meters according to the lookup table shown as in FIG. 5B.

FIG. 6 is a diagram illustrating a lookup table of the percentage of the vehicle image size occupied by the license plate image size and the following distance provided in accordance to an exemplary embodiment of the present disclosure.

Relative to the example of the lookup tables shown in FIG. 5A and FIG. 5B, the example shown in FIG. 6 is another type of lookup table for calculating the following distance. In the example, the processing module 203 takes the following distance by computing the license plate image size and the vehicle image size. Referring to FIG. 2, after extracting the license plate image from the vehicle image, the processing module 203 takes the pixels of the license plate image and the pixels of the vehicle image respectively. The processing module 203 does not need to analyze the license plate number in the example. The processing module 203 computes the ratio of the pixels of the license plate image and the pixels of the vehicle image for the following distance. As shown in FIG. 6, when the pixel ratio of the license plate image and the vehicle image is 80%, the processing module 203 takes the following distance as 2 meters according to the lookup table. It should be noted that the data of the lookup table shown as in FIG. 5A, FIG. 5B, and FIG. 6 are taken as examples in the present disclosure, and the method for computing the following distance by the following distance reminding device is not limited thereto.

An Exemplary Embodiment of a Method for Computing the Safe Distance

Another example will illustrate the method for computing the safe distance. Referring to FIG. 2 and FIG. 3, the processing module 203 computes the safe distance according to the driving speed of the first vehicle 1 and the vehicle type information of the image characteristics. What should be noted is that the image characteristics are such as the license plate number and the license plate color of the license plate image, and the license plate standard is required by each country. The vehicle type information can be retrieved based on the license plate standard of each country, for example, the license plate standard for the large vehicle, the small vehicle, the motorcycle, or other types of automobiles.

Particularly, for the method for computing the safe distance, the larger the driving speed of the first vehicle 1 is, the larger the braking distance is. Moreover, the braking distance is different from one vehicle type to another. The following example will illustrate how the processing module 203 determines whether the second vehicle 2 is a large vehicle or a small vehicle by the license plate color and/or the license plate number of the license plate image, and then compute the safe distance by the computation formula of the large vehicle or the small vehicle according to the determined result.

In the first example, when the first vehicle 1 is the small vehicle, the method for computing the safe distance by the processing module 203 is to take the safe distance as twice the driving speed (the safe distance (millimeter)=the driving speed (meter per second)×2). For example, when the driving speed of the small vehicle is 60 km/hr (kilometer per hour), that is, 16.6 meters per second, the safe distance is 33.2 meters. In another example, when the first vehicle 1 is the large vehicle, the method for computing the safe distance by the processing module 203 is to take the safe distance as the triple driving speed (the safe distance (millimeter)=the driving speed (meter per second)×3). For example, when the driving speed of the large vehicle is 90 km/hr, that is, 25 meters per second, the safe distance is 75 meters.

In the second example, when the first vehicle 1 is the small vehicle, the method for computing the safe distance by the processing module 203 is to take the safe distance as the half driving speed (the safe distance (millimeter)=the driving speed (kilometer per hour)÷2). For example, when the driving speed of the small vehicle is 60 km/hr, the safe distance is 30 meters. In another example, when the first vehicle 1 is the large vehicle, the method for computing the safe distance is to take the safe distance as two-thirds the driving speed (the safe distance (millimeter)=the driving speed (kilometer per second)×⅔). For example, when the driving speed of the large vehicle is 60 km/hr, the safe distance is 40 meters.

In the third example, the processing module 203 further computes the safe distance by determining the vehicle type of the second vehicle 2 according to the vehicle type information of the image characteristics. When the second vehicle 2 is the small vehicle, the method for computing the safe distance by the processing module 203 is to multiply the vehicle length of the second vehicle 2 by one factor and the driving speed of the first vehicle together (the safe distance=the driving speed of the first vehicle/10×the vehicle length of the second vehicle). Generally, for example, the vehicle length of the small vehicle is substantially 5 meters, therefore when the processing module 203 determines that the second vehicle 2 is the small vehicle and the driving speed of the first vehicle is 60 km/hr, the safe distance is six times the vehicle length, that is, 30 meters. In another example, when the second vehicle 2 is the large vehicle, the method for computing the safe distance by the processing module 203 is to multiply the vehicle length of the second vehicle by a second factor and the driving speed of the first vehicle together (the safe distance=the driving speed of the first vehicle/10×the vehicle length of the second vehicle). Generally, for example, the vehicle length of the large vehicle is substantially 10 meters, therefore when the processing module 203 determines that the second vehicle 2 is the large vehicle and the driving speed of the first vehicle is 90 km/hr, the safe distance is 90 meters.

It should be noted that the factors of the driving speed and the vehicle length mentioned above are taken as exemplary examples and should not be limited thereto.

Figure 7:
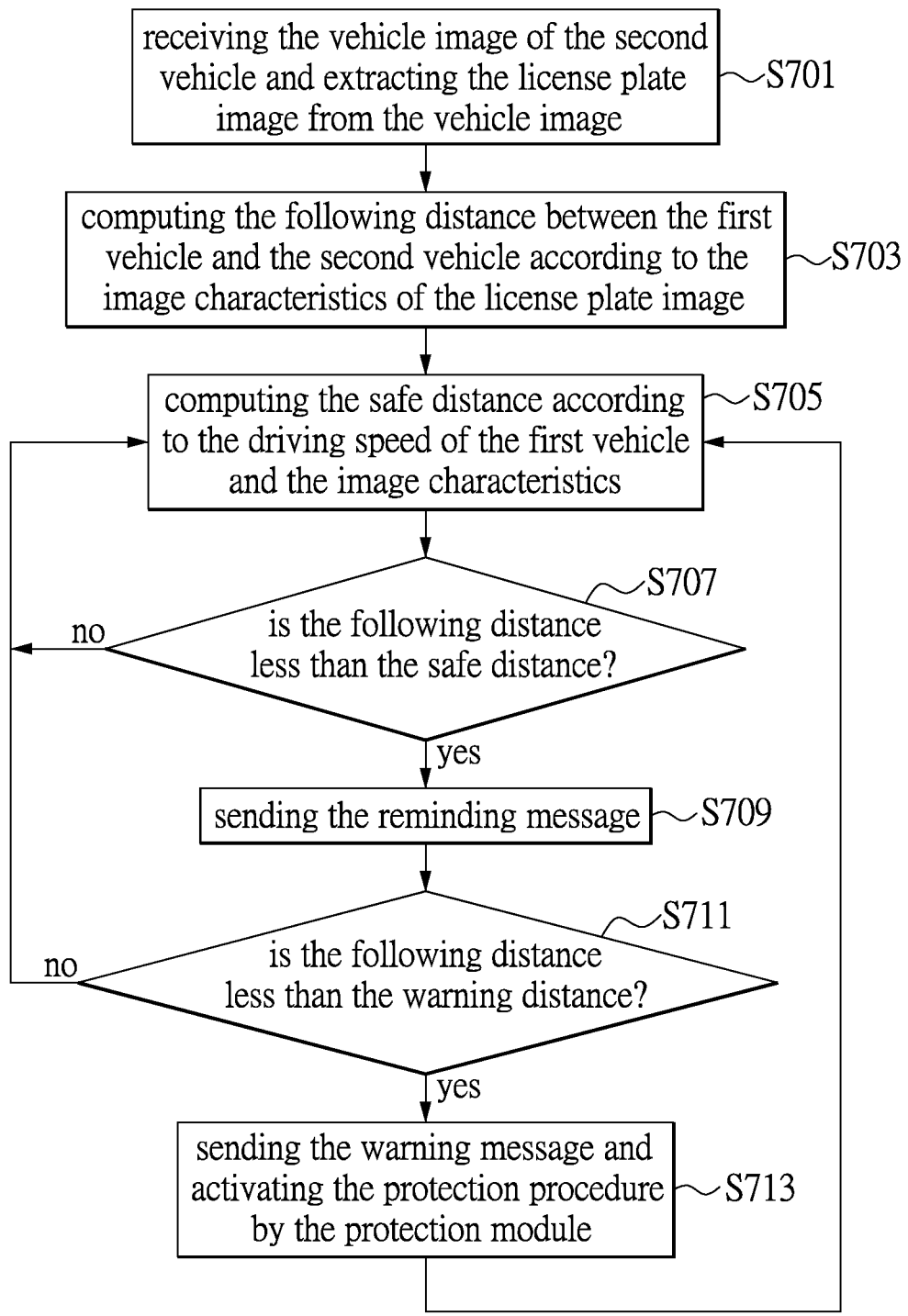
FIG. 7 is a flowchart illustrating a method for reminding following distance provided in accordance to exemplary embodiment of the present disclosure.

FIG. 7 is a flowchart illustrating a method for reminding following distance provided in accordance to exemplary embodiment of the present disclosure.

Referring to FIG. 3 and FIG. 7, the method for reminding following distance is adapted for computing the following distance between the first vehicle 1 and the second vehicle 2. The flowchart steps are illustrated as the following.

In step S701, the image acquiring module receives the vehicle image of the second vehicle, and extracts the license plate image from the vehicle image. When the following distance reminding device receives the license plate image of the second vehicle, in step S703, the processing module computes the following distance between the first vehicle and the second vehicle according to the image characteristics of the license plate image. The method for computing the following distance is illustrated in the above exemplary example, therefore it should not be necessary to go into details. Next, in step S705, the processing module computes the safe distance according to the driving speed of the first vehicle and the image characteristics. The method for computing the safe distance is illustrated in the above exemplary example, therefore it should not be necessary to go into details. After taking the safe distance, in step S707, the processing module further determines whether the following distance between the first vehicle and the second vehicle is less than the safe distance. If yes, the processing module controls the reminding module to send the reminding message in step S709. If no, the step goes back to step S705 for computing the safe distance. After sending the reminding message in step S709, the processing module further determines whether the following distance is less than the warming distance, as illustrated in step S711. If yes, the processing module controls the warning module to send the warning message and the protection module to activate the protection procedure at the same time in step S713. It should be noted that the protection module and the warning module may work at the same time or be respectively activated based on the practical situation. Hence, the activation level of the protection module is more elastic. On the other hand, the protection module may not work together with the warning module, for example, there may be one of the protection module and the warning module activating. In practice, the protection module may work in the setting conditions based on practical situations, and it should not be limited to the protection module and the warning module working at the same time. If the condition in step S711 is negative, the step goes back to the step S705 for computing the safe distance.

Figure 8:
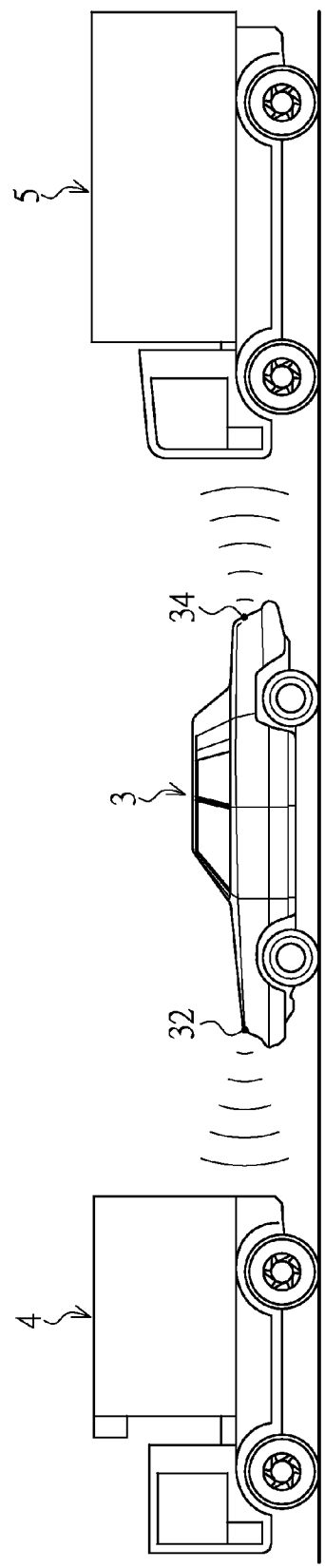
FIG. 8 is a side view diagram illustrating the vehicles driving on roads in which the following distance reminding device is disposed on the vehicle provided in accordance to another exemplary embodiment of the present disclosure.

In the other example, the image acquiring module of the following distance reminding device disposed on the vehicle can further comprise at least one image acquiring device. FIG. 8 is a side view diagram illustrating the vehicles driving on roads in which the following distance reminding device is disposed on the vehicle provided in accordance to the other exemplary embodiment of the present disclosure. As shown in FIG. 8, the first vehicle 3 drives behind the second vehicle 4, and ahead of the third vehicle 5. In the example, the second vehicle 4 is the small vehicle and the third vehicle 5 is the large vehicle. The following distance reminding device is disposed on the first vehicle 3, and is coupled to a first image acquiring device 32 and a second image acquiring device 34. The first image acquiring device 32 is disposed on the front side of the first vehicle 3 to receive the license plate image of the rear of the second vehicle 4. The image acquiring device 34 is disposed on the back side of the first vehicle 3 to receive the license plate image of the front of the third vehicle 5. The methods for computing the following distance, the safe distance, and sending the reminding message are mentioned above, and it should not be necessary to go into details. Therefore, the following distance reminding device provided in the disclosure can be coupled to at least one image acquiring device and can provide users of the first vehicle 3 to optionally choose the view to receive the vehicle image.

Hence, the view to receive the vehicle image by the first vehicle 3 can be adjusted and the traffic security for the first vehicle 3 is increased.

It should be noted that after the image acquiring device 32 receives the vehicle image of the second vehicle 4 in the example, when the following distance reminding device determines that the following distance between the first vehicle 3 and the second vehicle 4 is too small, the reminding module of the following distance reminding device sends the message for reminding the user of the first vehicle 3 to decrease the driving speed. On the other hand, when the following distance reminding device determines that the following distance between the first vehicle 3 and the third vehicle 5 is too small, the reminding module of the following distance reminding device sends the message for reminding the user of the first vehicle to increase the driving speed. Besides, in the provided disclosure, when the processing module of the following distance reminding device determines that the following distance between the first vehicle 3 and the second vehicle 4 and that between the first vehicle and the third vehicle 5 are too small at the same time, the reminding module will send the message for reminding the user of the first vehicle 3 to switch the lane. Therefore, the user may be warned in advance and then obtain the time for leaving the current lane to go to another, so that the present disclosure can prevent the dangerous situation of the first vehicle 3 from crashing in between the second vehicle 4 and the third vehicle 5.

In summary, the following distance reminding device and the method thereof are provided by using the image processing means to compute the following distance, and receive the vehicle type information of the adjacent vehicles by analyzing the license plate image of the vehicle image, so as to remind the user to keep the following distance equal to or more than the safe distance, hence the traffic safety of the first vehicle 3 is increased. Besides, the following distance reminding device and the method thereof provided in the disclosure can decrease the hardware cost by using the image processing means, and can also accurately and immediately determine whether the vehicle drives in a safe traffic condition.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A following distance reminding device, adapted for a first vehicle, computing a following distance between the first vehicle and a second vehicle, the following distance reminding device comprising:
    an image acquiring module, receiving a vehicle image of the second vehicle;
    a reminding module;
    a processing module coupled to the image acquiring module and the reminding module; and
    a speed signal reception interface coupled to the processing module;
    wherein the processing module extracts a license plate image from the vehicle image, and computes the following distance between the first vehicle and the second vehicle according to image characteristics of the license plate image, wherein the image characteristics comprise a license plate size of the license plate image, and the processing module computes the following distance according to the license plate size;

wherein the processing module computes a safe distance according to a driving speed of the first vehicle and the image characteristics, and determines whether the following distance is more than the safe distance or not, in order to control the reminding module to correspondingly send a reminding message;

wherein the image characteristics further comprise a vehicle type information, and the processing module computes the safe distance according to the driving speed received by the speed signal reception interface and the vehicle type information;

wherein the vehicle type information comprises at least one of a license plate color and a license plate number of the license image;

wherein the processing module determines whether the second vehicle is a large vehicle or a small vehicle according to the license plate color or the license plate number, and computes the safe distance based on a computation formula corresponding to the large vehicle or the small vehicle.

2. The following distance reminding device according to claim 1, further comprising:

a storage module, storing the image characteristics and a lookup table, wherein the processing module searches the license plate size in the lookup table having at least one default license plate size, and computes the following distance based on the searching result.

3. The following distance reminding device according to claim 1, wherein the processing module compares the license plate size with the size of the vehicle image, and computes the following distance according to the comparison result.

4. The following distance reminding device according to claim 1, wherein the reminding module sends the reminding message when the following distance is less than the safe distance, and the reminding message is the prompting message for accelerating or decelerating driving speed of the first vehicle.

5. The following distance reminding device according to claim 1, further comprising:

a warning module coupled to the processing module and controlled by the processing module, sending a warning message when the following distance is less than a warning distance, wherein the warning distance is less than the safe distance, and the warning message comprises at least one of a light sign and a horn sign generated by the first vehicle;

a recording module coupled to the processing module and controlled by the processing module, storing the vehicle image received by the image acquiring device when the following distance is less than the safe distance;

a communication module coupled to the processing module and controlled by the processing module, transmitting the vehicle image stored in the recording module through a communication network to a network server for backup;

a protection module coupled to the processing module and controlled by the processing module, activating a protecting procedure when the following distance is less than the warning distance, to control the following distance between the first vehicle and the second vehicle;

wherein the image acquiring module comprises a first image acquiring device and a second image acquiring device, the first image acquiring device is disposed on the front side of the first vehicle, and receives the vehicle image of the second vehicle when the second vehicle is located ahead of the first vehicle, the second image acquiring device is disposed on the rear side of the first vehicle, and receives the vehicle image of the second vehicle when the second vehicle is located behind the first vehicle, and the warning module sends the warning message toward the second vehicle when the protection module activates the protecting procedure.

6. A method for reminding following distance, adapted for a first vehicle, computing a following distance between the first vehicle and a second vehicle, the method comprising:

receiving a vehicle image of the second vehicle;

extracting a license plate image from the vehicle image;

computing the following distance between the first vehicle and the second vehicle according to image characteristics of the license plate image, wherein the image characteristics comprise a license plate size of the license plate image, and the following distance is computed based on the license plate size;

computing a safe distance according to a driving speed of the first vehicle and the image characteristics, wherein the image characteristics further comprise a vehicle type information of the license plate image, and the safe distance is computed by the driving speed and the vehicle type information; wherein the vehicle type information comprises at least one of the license plate color and the license plate number of the license plate image; wherein according to the license plate color or the license plate number of the license plate image, it is determined whether the second vehicle is a large vehicle or a small vehicle, and the safe distance is computed by the computation formula corresponding to the large vehicle or the small vehicle;

determining whether the following distance is more than the safe distance; and correspondingly sending a reminding message depending on the determined result.

7. The method for reminding following distance according to claim 6, wherein the following distance is computed by the result of comparing the license plate size with at least one default license plate size.

8. The method for reminding following distance according to claim 6, wherein the following distance is computed by the result of comparing the license plate size and the size of the vehicle image.

9. The method for reminding following distance according to claim 6, further comprising the step:

sending a reminding message when the following distance is less than the safe distance, wherein the reminding message is the prompting message for accelerating or decelerating driving speed of the first vehicle.

10. The method for reminding following distance according to claim 6, further comprising:

sending a warning message when the following distance is less than a warning distance, wherein the warning distance is less than the safe distance, the warning message comprises at least one of a light sign and a horn sign generated by the first vehicle;

storing the vehicle image by a recording module when the following distance is less than the safe distance; and transmitting the vehicle image stored by the recording module through a communication network to a network server for backup when the following distance is less than the warning distance;

wherein the vehicle image of the second vehicle is received by an image acquiring module, the image acquiring module comprises a first image acquiring device and a second acquiring device, the first image acquiring device is disposed on the front side of the first vehicle, and receives the vehicle image when the second vehicle is located ahead of the first vehicle, the second image acquiring device is disposed on the rear side of the first vehicle, and receives the vehicle image when the second vehicle is located behind the first vehicle.

* * * * *